(12) United States Patent
Jha et al.

(10) Patent No.: US 11,841,124 B2
(45) Date of Patent: Dec. 12, 2023

(54) AIRCRAFT BEACON LIGHT, METHOD OF OPERATING AN AIRCRAFT BEACON LIGHT, AND METHOD OF PRODUCING AN AIRCRAFT BEACON LIGHT

(71) Applicant: Goodrich Lighting Systems GmbH & Co. KG, Lippstadt (DE)

(72) Inventors: Anil Kumar Jha, Lippstadt (DE); Jens Leuschner, Möhnesee (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/984,429

(22) Filed: Nov. 10, 2022

(65) Prior Publication Data

US 2023/0151943 A1    May 18, 2023

(30) Foreign Application Priority Data

Nov. 12, 2021  (EP) .................................... 21208043

(51) Int. Cl.

| F21S 43/19 | (2018.01) |
|---|---|
| F21S 43/14 | (2018.01) |
| B64D 47/02 | (2006.01) |
| F21V 3/02 | (2006.01) |
| F21V 17/18 | (2006.01) |
| F21W 107/30 | (2018.01) |

(52) U.S. Cl.
CPC ............ *F21S 43/195* (2018.01); *B64D 47/02* (2013.01); *F21S 43/14* (2018.01); *F21V 3/02* (2013.01); *F21V 17/18* (2013.01); *B64D 2203/00* (2013.01); *F21W 2107/30* (2018.01)

(58) Field of Classification Search
CPC ................................ H05B 47/21; B64D 47/06
See application file for complete search history.

(56) References Cited

U.S. PATENT DOCUMENTS

| 7,357,530 | B2 | 4/2008 | Wang et al. |
| 7,645,053 | B2 | 1/2010 | Machi et al. |
| 9,483,919 | B2 * | 11/2016 | Di Giovine ............ F21V 17/005 |
| 9,695,998 | B2 * | 7/2017 | Zeng ....................... F21S 10/00 |
| 2005/0110649 | A1 | 5/2005 | Fredericks et al. |

(Continued)

FOREIGN PATENT DOCUMENTS

| EP | 3284684 A1 | 2/2018 |
| WO | 0241276 A2 | 5/2002 |

OTHER PUBLICATIONS

Extend European Search Report for Application No. 21208043.6, dated Apr. 11, 2022, 7 pages.

*Primary Examiner* — Eric T Eide
(74) *Attorney, Agent, or Firm* — CANTOR COLBURN LLP

(57) ABSTRACT

An aircraft beacon light includes a light source carrier, wherein the light source carrier comprises a plurality of connection fields, with the plurality of connection fields forming at least two polygonal connection structures on the light source carrier. The beacon also includes a plurality of LED modules, with the plurality of LED modules being arranged along a particular one of the at least two polygonal connection structures and with each of the plurality of LED modules being coupled to a respective connection field of said particular one of the at least two polygonal connection structures.

19 Claims, 8 Drawing Sheets

(56) References Cited

U.S. PATENT DOCUMENTS

| | | | | |
|---|---|---|---|---|
| 2007/0164875 A1* | 7/2007 | Fredericks | .............. | F21V 29/74 |
| | | | | 340/815.45 |
| 2011/0261577 A1* | 10/2011 | Kohlmeier-Beckmann | ................. | |
| | | | | F21S 43/14 |
| | | | | 362/545 |
| 2014/0254189 A1* | 9/2014 | Stein | ........................ | H05K 1/14 |
| | | | | 362/540 |
| 2018/0156440 A1* | 6/2018 | Eggink | ................... | F21V 23/02 |

* cited by examiner

AIRCRAFT BEACON LIGHT, METHOD OF OPERATING AN AIRCRAFT BEACON LIGHT, AND METHOD OF PRODUCING AN AIRCRAFT BEACON LIGHT

CROSS-REFERENCE TO RELATED APPLICATIONS

This application claims priority to European Patent Application No. 21208043.6 filed Nov. 12, 2021, the entire contents of which is incorporated herein by reference.

TECHNICAL FIELD

The present invention relates to exterior aircraft lighting. In particular, it relates to an aircraft beacon light, to an aircraft equipped therewith, to a method of operating an aircraft beacon light, and to a method of producing an aircraft beacon light.

BACKGROUND

Almost all aircraft are equipped with exterior lighting systems. For example, large commercial aircraft have many different exterior lights. An exemplary group of exterior aircraft lights are lights for passive visibility, such as navigation lights, white strobe anti-collision lights, and red-flashing beacon lights. Many aircraft have two red-flashing beacon lights, arranged on the top of the aircraft fuselage and on the bottom of the aircraft fuselage, respectively. Their red flashes at least indicate that the engines of the aircraft are turned on. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights. Given the large number of different aircraft models, in particular when counting both air planes and helicopters, given the desire for optimized adaptation of aircraft lights to particular aircraft models, and given the existing different sets of requirements for light outputs, many different aircraft lights have been developed and are in use, leading to high production complexity and cost.

Accordingly, it would be beneficial to provide an exterior aircraft light that is well-adapted to a particular use case, while keeping the production complexity low. Further, it would be beneficial to provide a method of producing an exterior aircraft light that allows for the production of many light variations with a low number of parts.

SUMMARY

Exemplary embodiments of the invention include an aircraft beacon light, comprising: a light source carrier, wherein the light source carrier comprises a plurality of connection fields, with the plurality of connection fields forming at least two polygonal connection structures on the light source carrier; and a plurality of LED modules, with the plurality of LED modules being arranged along a particular one of the at least two polygonal connection structures and with each of the plurality of LED modules being coupled to a respective connection field of said particular one of the at least two polygonal connection structures.

Exemplary embodiments of the invention allow for the provision of an aircraft beacon light that is the result of a comparably little complex production process and this is well-adapted to a particular use case. With the light source carrier having at least two polygonal connection structures, the LED modules may be arranged on the light source carrier in at least two different configurations during production. A suitable layout of the LED modules may be chosen among two or more arrangement options during production. By simply choosing one of the at least two polygonal connection structures, which is an easy selection step during production and does not require an adaptation of the light source carrier, the arrangement of the plurality of LED modules and, thus, the light output of the aircraft beacon light may be adapted to the particular use case in a convenient manner. Also, the light source carrier having two or more polygonal connection structures may allow for easily re-configuring the aircraft beacon light during its lifetime, e.g. when servicing the aircraft beacon light and/or when re-using the aircraft beacon light on a different aircraft.

The light source carrier comprises a plurality of connection fields. The plurality of connection fields may all be of identical design, such that a standardized kind of LED module, in particular an LED module with a standardized kind of connection structure, may generally be coupled to each of the plurality of connection fields. The connection field may therefore also be referred to as a connection unit or a unit connection module. Each of the plurality of connection fields may comprise a linear arrangement of connection elements, such as a linear arrangement of recesses within the light source carrier. The connection fields may also be seen as connection arrays or connection blocks of multiple connection elements.

The aircraft beacon light may be an aircraft beacon light for being mounted to an aircraft fuselage. In particular, the aircraft beacon light may have a mounting structure that allows for mounting the aircraft beacon light to the aircraft fuselage. In particular, the mounting structure may be configured for mounting the aircraft beacon light to a top portion/an upper portion of the aircraft fuselage and/or for mounting the aircraft beacon light to a bottom portion/lower portion of the aircraft fuselage.

The aircraft beacon light is a red-flashing aircraft beacon light. In other words, the aircraft beacon light is configured to emit a red-flashing beacon light output in operation. In yet other words, the aircraft beacon light is configured to emit flashes of red light in operation. The flashes of red light contribute to the beacon light functionality of the aircraft. The plurality of LED modules may comprise a plurality of red LEDs. In this way, red light is generated and emitted from the aircraft beacon light. It is also possible that light optics, which may be provided for conditioning the light output of the aircraft beacon light, and/or a lens cover of the aircraft beacon light comprise a red color filter. In this case, the plurality of light sources may for example be white light sources, with the downstream color filter providing for the red light output. The term red light output encompasses any kind of reddish shade of light. The red light output may be an aviation red light output in accordance with Federal Aviation Regulations (FAR) section 25.1397 or Federal Aviation Regulations (FAR) section 27.1397.

The aircraft beacon light is configured to emit a red-flashing beacon light output in operation. The beacon light output may be in accordance with Federal Aviation Regulations (FAR) section 25.1401, when the aircraft is an air plane, or may be in accordance with Federal Aviation Regulations (FAR) section 27.1401, when the aircraft is a rotorcraft. In particular, the beacon light output may satisfy the light intensity requirements of Federal Aviation Regulations (FAR) section 25.1401/27.1401 at least for a hemisphere above or below the horizontal plane. In other words, the beacon light output may satisfy at least the upper or the lower half of the light intensity requirements. The beacon light output may be achieved by the plurality of LED modules or may be jointly achieved by the plurality of LED modules in combination with light conditioning optics and/or the lens cover. The lens cover may have an active impact on shaping the beacon light output or may substantially pass through the light output, as generated by the plurality of LED modules or as produced by the plurality of LED modules in cooperation with light conditioning optics.

The aircraft beacon light is configured to emit flashes of red light in operation. This wording relates to the perception of the light output by the observer. For example, a person on the airfield, when in the output range of the aircraft beacon light, sees red light flashes emitted by the aircraft beacon light.

The aircraft beacon light is configured to emit flashes of red light in operation. In particular, the aircraft beacon light may have a control unit that selectively provides electric power to the plurality of light sources, thus illuminating the plurality of light sources in an intermittent manner, which in turn provides for the emission of red light flashes by the aircraft beacon light in operation. The control unit may be coupled to an aircraft on-board power supply network on the one hand and to the plurality of LED modules on the other hand.

The aircraft beacon light comprises a plurality of LED modules. Each of the plurality of LED modules may comprise one or more LEDs. In a particular embodiment, the plurality of LED modules may comprise only LEDs of the same color, e.g. a plurality of red LEDs or a plurality of white LEDs only. It is also possible that the plurality of LED modules comprise a plurality of red LEDs and, in addition, comprise a plurality of white LEDs and/or a plurality of infrared LEDs. The aircraft beacon light may thus integrate a white-flashing operation and/or an IR-flashing operation with above discussed red-flashing operation. For example, the aircraft beacon light may be adapted for use cases relying on visible light for some operation scenarios and relying on IR light for covert operations.

The aircraft beacon light may comprise light conditioning optics for re-directing at least a portion of light emitted by the plurality of LED modules. The light conditioning optics may comprise one or more lenses and/or one or more reflectors and/or one or more shutters. In a particular embodiment, the light conditioning optics may comprise one or more lenses and may be free from metallic reflectors and shutters.

According to a further embodiment, each of the plurality of connection fields comprises a plurality of electric connections between the respective LED module and the light source carrier. The plurality of electric connections may be integrated into the plurality of connection elements that make up the connection field. In particular, each of the plurality of connection fields may comprise a linear arrangement of a plurality of electric connections.

According to a further embodiment, the plurality of electric connections comprise two power terminals, a communication terminal, and an LED module detection terminal. In this way, the connection field may be equipped to supply power to the respective LED module, to provide a communication interface to the respective LED module, and to provide functionality for detecting whether an LED module is coupled to the connection field in question. With this setup, the presence of an LED module can be detected via a dedicated terminal, namely the LED module detection terminal, thus allowing a reliable detection of the presence of an LED module, and additional information may be queried from and/or provided to the LED module via the communication terminal. It is also possible that the power supply functionality, the LED module detection functionality, and the communication functionality are integrated into a lower number of electric connections, such as one or two or three electric connections. It is also possible that each of the plurality of connection fields comprises a higher number of electric connections, i.e. more than four electric connections.

According to a further embodiment, each of the plurality of connection fields comprises a mechanical socket and each of the plurality of LED modules is coupled to the mechanical socket of the respective connection field. The mechanical socket may comprise a plurality of socket elements. The plurality of socket elements may be integrated into the plurality of connection elements, as described above. The plurality of connection elements may in particular function both as mechanical socket elements and as electric connections. In this way, the mechanical coupling between an LED module and an associated connection field may be integrated with the electric connection between these components. In accordance with above description of the connection elements of a particular connection field, the socket elements of a particular connection field may be arranged in a linear arrangement. In other words, each of the plurality of connection fields may comprise a linear arrangement of mechanical socket elements.

According to a further embodiment, each of the plurality of LED modules comprises a plurality of connection pins, introduced into associated recesses of the mechanical socket. In other words, each of the plurality of LED modules may comprise a plurality of connection pins, introduced into mechanical socket elements of the associated connection field. The connection pins may be pushed or press-fit or clipped into the respective recesses. The connection pins may be additionally soldered to the light source carrier for enhanced connection strength/stability.

According to a further embodiment, the at least two polygonal connection structures comprise between 2 and 12 polygonal connections structures. The higher the number of polygonal connection structures, the more flexibility may be provided by the light source carrier during production. In particular, a higher number of polygonal connection structures may provide for a higher number of possible arrangements of LED modules on the light source carrier. On the other hand, the higher the number of polygonal connection structures, the higher the space requirements on the light source carrier may become for the plurality of connection fields. By providing a suitable number of polygonal connection structures, a desired trade-off between production flexibility and space requirements for the polygonal connection structures may be achieved.

According to a further embodiment, the at least two polygonal connection structures comprise at least two of a triangular connection structure, a tetragonal connection structure, a pentagonal connection structure, a hexagonal connection structure, a heptagonal connection structure, an octagonal connection structure, a nonagonal connection structure, a decagonal connection structure, a hendecagonal connection structure, and a dodecagonal connection structure. In particular, the plurality of connection fields may form any subset of exactly two of aforesaid polygonal connection structures or any subset of exactly three of aforesaid polygonal connection structures or any subset of exactly four of aforesaid polygonal connection structures or any subset of exactly five of aforesaid polygonal connection structures or any subset of exactly six of aforesaid polygonal connection structures or any subset of exactly seven of aforesaid polygonal connection structures or any subset of exactly eight of aforesaid polygonal connection structures or any subset of exactly nine of aforesaid polygonal connection structures or all ten of aforesaid polygonal connection structures.

According to a further embodiment, the at least tow polygonal connection structures have regular polygonal shapes. In this way, a well-behaved, potentially largely uniform light intensity distribution may be achieved all around the aircraft beacon light, i.e. in a 360° angle around the aircraft beacon light.

According to a further embodiment, the at least two polygonal connection structures are nested polygonal connection structures. In other words, the plurality of connection fields may form at least two polygonal connection structures that circum-scribe each other. In this way, the two or more polygonal connection structures may be arranged on the light source carrier in a particularly space-efficient manner, leading to an overall space-efficient design of the aircraft beacon light.

According to a further embodiment, the plurality of LED modules are a plurality of LED strips, with each LED strip comprising between 2 and 8 LED units, in particular between 2 and 5 LED units. In other words, each of the plurality of LED modules may be an LED strip having between 2 and 8 LED units, in particular between 2 and 5 LED units. The LED strips may be parts of a large LED unit stock, wherein the LED unit stock may be originally in the form of a long chain of LED units. During production, the comparably short LED strips may be taken from, in particular torn from the LED unit stock and may be arranged on the light source carrier. In this way, the production of a large variety of aircraft beacon lights, namely of aircraft beacon lights with different arrangements of LED modules and different numbers of LED units per LED module, may be conveniently achieved with only one kind of light source carrier and only one kind of LED unit stock.

With the plurality of LED modules being a plurality of LED strips, two convenient degrees of freedom for adapting the aircraft beacon light during production are provided. The selection of a particular polygonal connection structure is a first degree of freedom for adapting the aircraft beacon light, while the selection of the number of LED units per LED strip is a second degree of freedom for adapting the aircraft beacon light. Via the number of LED units per LED strip and the selection of the particular polygonal connection structure, desired light intensities around the aircraft beacon light may be achieved. Also, multi-function beacon lights, e.g. beacon lights with additional white-flashing functionality and/or additional IR-flashing functionality, may be conveniently achieved by arranging an alternating order of red LED strips and white and/or IR LED strips along the particular polygonal connection structure.

Each of the LED units may have exactly one LED or may comprise a plurality of LEDs.

According to a further embodiment, the plurality of LED strips have a substantially orthogonal orientation with respect to the light source carrier, with the plurality of LED units of each LED strip forming an LED stack on the light source carrier. In other words, the LED units of each LED strip have different distances with respect to the light source carrier in a direction orthogonal to the light source carrier. In this way, the plurality of LED strips may jointly form a polygonal tower on the light source carrier, with the polygonal tower being configured to provide light emission outwardly around its circumference.

According to a further embodiment, the plurality of LED strips are me-chanically coupled to each other along their edges, i.e. at the corners of the particular polygonal connection structure. In this way, the plurality of LED strips may support each other, contributing to a stable design of the aircraft beacon light.

According to a further embodiment, for at least one of the plurality of LED strips, each of the LED units comprises an LED and an integrated circuit. With the integrated circuit, some level of intelligence may be provided at the LED unit. Via this intelligence, communication between the LED unit and the control unit of the aircraft beacon light may be established. For example, the integrated circuit may comprise a memory containing an LED unit identifier. On the basis thereof, an exchange with respect to the specifics of the LED unit may be established between the LED unit and the control unit of the aircraft beacon light. It is further possible that sensing capabilities are provided at the integrated circuit or may be associated therewith. For example, a temperature sensor and/or a light intensity sensor and/or a humidity sensor and/or other types of sensors may be provided with the integrated circuit or may be associated therewith. In this way, feedback about the operating conditions of a particular LED unit may be communicated to the control unit of the aircraft beacon light. It is also possible that the data about the operating conditions may be saved and may be accessed a later point in time, e.g. during maintenance of the aircraft beacon light and/or during failure anal-ysis upon detecting a failure of the aircraft beacon light.

According to a further embodiment, for at least one of the plurality of LED strips, at least one power line and at least one communication line run along the LED units of the LED strip. The communication line may in particular be a communication bus. The at least one power line may in particular be two power lines, enabling a closed circuit through the LED strip. It is possible that only one or a subset or all of the plurality of LED strips have said at least one communication line. In case not all of the plurality of LED strips have said at least one communication line, the control unit of the aircraft beacon light may communicate with those LED strips that have such at least one communication line and may make assumptions about the other LED strips. For example, the control unit of the aircraft beacon light may assume that those LED strips that do not have such at least one communication line have the same number of LED units as those LED strips that have at least one communication line.

According to a further embodiment, the light source carrier is a printed circuit board (PCB). In this way, the light source carrier may have the electrical connections between the plurality of connection fields and the control unit of the aircraft beacon light integrated within the light source carrier in a particularly convenient manner. Both the communication between the LED modules and the control unit of the aircraft beacon light as well as the power supply connections to the LED modules may be integrated into the light source carrier. With the printed circuit board providing different configurations/layouts for the plurality of LED modules via the polygonal connection structures, the printed circuit board may also be referred to as a configuration PCB.

According to a further embodiment, the aircraft beacon light further comprises a light transmissive lens cover, arranged over the light source carrier and the plurality of LED modules. The light transmissive lens cover may in particular a dome-shaped light transmissive lens cover. The light transmissive lens cover may be made from PMMA or other suitable light transmissive material that provides sufficient strength as an outermost component of an exterior aircraft light. The light transmissive lens cover may in particular be a transparent lens cover. It is also possible that the light transmissive lens cover has a color filter functionality, e.g. that the light transmissive lens cover acts as a red light filter.

According to a further embodiment, the aircraft beacon light has a control unit that is configured to set at least one operating parameter for the plurality of LED modules based on the particular one of the at least two polygonal connection structures and based on a number of LED units per LED module and that is configured to operate the plurality of LED modules in accordance with said at least one operating parameter. The at least one operating parameter may comprise an operating current, in which case the control unit may set the operating current for the plurality of LED modules based on the particular one of the at least two polygonal connection structures and based on a number of LED units per LED module. By setting one or more operating parameters in this way, the operation of the plurality of LED modules may be adapted in accordance with above discussed two degrees of freedom, namely the selection of the particular one of the at least two polygonal connection structures and the number of LED units per LED module.

According to a further embodiment, the control unit is configured to detect the particular one of the at least two polygonal connection structures, along which the plurality of LED modules are arranged, and/or to determine, for at least one of the plurality of LED modules, a number of LED units in said at least one of the plurality of LED modules. In this way, the control unit may be in a position to determine the layout of the aircraft beacon light without prior knowledge, namely from detecting the presence of LED modules and/or querying the LED modules. It is also possible that the information about the particular one of the at least two polygonal connection structures, along which the plurality of LED modules are arranged, and/or the information about the number of LED units per LED module is stored in the control unit during production and/or initialization and/or maintenance. In this case, the control unit may control the LED modules in a suitable manner, without having to identify the layout out of its own motion.

Exemplary embodiments of the invention further include an aircraft, comprising at least one aircraft beacon light, as described in any of the embodiments above. The aircraft may in particular be an air plane or a rotorcraft. In a particular embodiment, the aircraft comprises an upper aircraft beacon light, as described in any of the embodiments above, arranged on an upper portion of a fuselage of the aircraft, and/or a lower aircraft beacon light, as described in any of the embodiments above, arranged on a lower portion of the fuselage of the aircraft. The additional features, modifications and technical effects, as described above with respect to the aircraft beacon light, apply to the aircraft in an analogous manner.

Exemplary embodiments of the invention further include a method of operating an aircraft beacon light, as described in any of the embodiments above, comprising: detecting the particular one of the at least two polygonal connection structures, along which the plurality of LED modules are arranged; for at least one of the plurality of LED modules, determining a number of LED units in said at least one of the plurality of LED modules; on the basis of the particular one of the at least two polygonal connection structures and on the basis of the number of LED units, setting at least one operating parameter for the plurality of LED modules; and operating the plurality of LED modules in accordance with said at least one operating parameter. The step of setting at least one operating parameter for the plurality of LED modules may comprise setting an operating current for the plurality of LED modules. The additional features, modifications and technical effects, as described above with respect to the aircraft beacon light, apply to the method of operating an aircraft beacon light in an analogous manner.

According to a further embodiment, the step of setting at least one operating parameter for the plurality of LED modules on the basis of the particular one of the at least two polygonal connection structures and on the basis of the number of LED units may comprise setting the at least one operating parameter in accordance with a look-up table that contains values for the at least one operating parameter depending on the at least two polygonal connection structures and potential numbers of LED units per LED module. The look-up table may reflect which aircraft beacon light layouts are intended for which aircraft models and, thus, which operating parameters are used for achieving a desired behavior of the aircraft beacon light on the particular aircraft model.

Exemplary embodiments of the invention further include a method of producing an aircraft beacon light, comprising: providing a light source carrier, wherein the light source carrier comprises a plurality of connection fields, with the plurality of connection fields forming at least two polygonal connection structures on the light source carrier; and arranging a plurality of LED modules, in particular a plurality of LED strips, along a particular one of the at least two polygonal connection structures and coupling each of the plurality of LED modules to a respective connection field of said particular one of the at least two polygonal connection structures. The additional features, modifications and technical effects, as described above with respect to the aircraft beacon light, apply to the method of producing an aircraft beacon light in an analogous manner.

According to a further embodiment, said arranging of a plurality of LED modules along a particular one of the at least two polygonal connection structures comprises: coupling at least one LED module of a first kind, comprising at least one integrated circuit, to at least one connection field of said particular one of the at least two polygonal connection structures; and coupling at least one LED module of a second kind, not comprising an integrated circuit, to at least one connection field of said particular one of the at least two polygonal connection structures. In this way, one or more elaborate LED modules, having integrated circuit(s), and one or more less elaborate LED modules, not having integrated circuit(s), may be combined along the particular one of the at least two polygonal connection structures. In this way, a good trade-off between providing an effective infrastructure for increasing functionality via the integrated circuits, manageable production costs, and still low part numbers may be achieved.

BRIEF DESCRIPTION OF FIGURES

Further exemplary embodiments of the invention will be described below with respect to the accompanying drawings, wherein.

DETAILED DESCRIPTION

Figure 1:
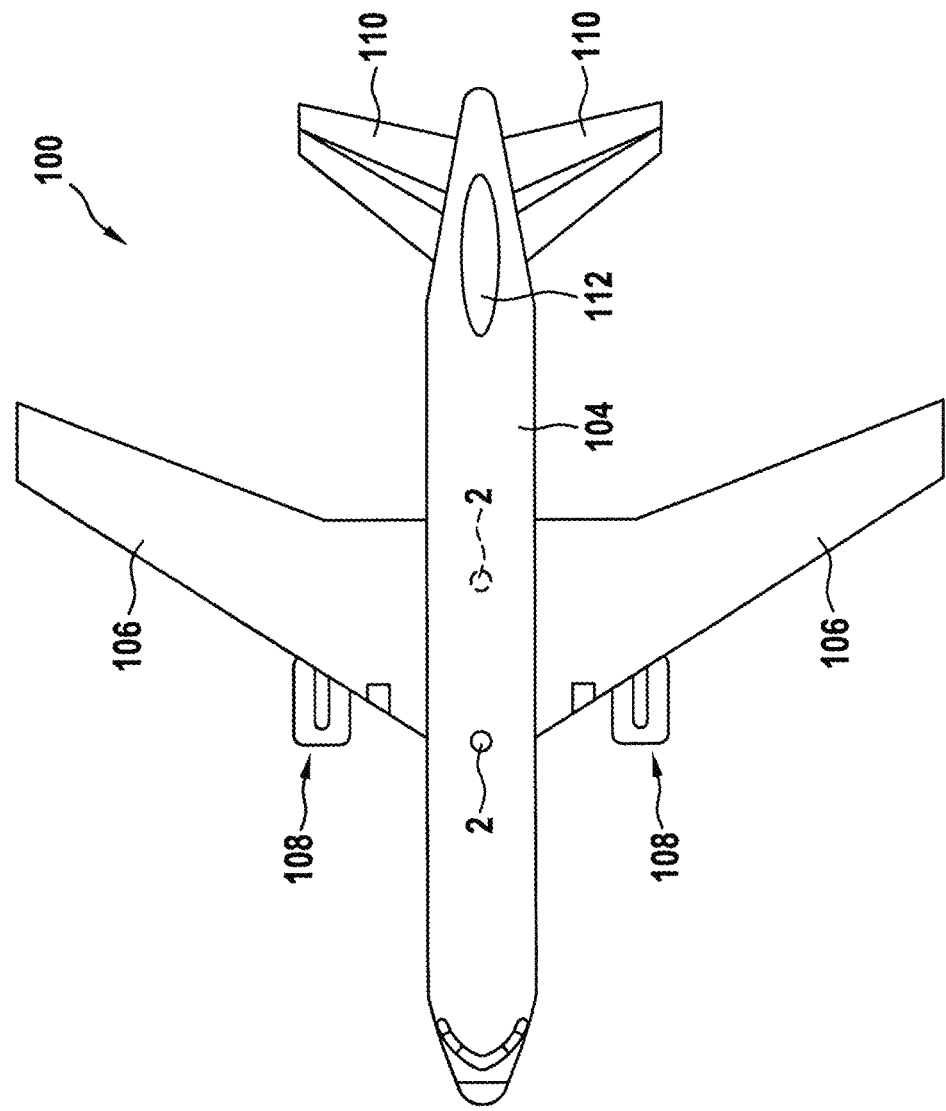
FIG. 1 shows an aircraft in accordance with an exemplary embodiment of the invention, equipped with two aircraft beacon lights in accordance with exemplary embodiments of the invention, in a schematic top view.

FIG. 1 shows an aircraft 100 in accordance with an exemplary embodiment of the invention. The aircraft 100 of FIG. 1 is an airplane, in particular a large commercial passenger or cargo air plane. It is pointed out that other types of aircraft, such as rotorcraft, may also be implemented in accordance with exemplary embodiments of the present invention.

The aircraft 100 has a fuselage 104. Two wings 106 are attached to the right and to the left of the fuselage 104. Each of the wings 106 carries a respective engine 108. Further, two horizontal stabilizers 110 and a vertical stabilizer 112 are mounted to a tail portion of the fuselage 104. Again, it is pointed out that aircraft in accordance with other designs and constructions are encompassed by exemplary embodiments of the present invention.

The aircraft 100 comprises two aircraft beacon lights 2, mounted to the fuselage 104. An upper aircraft beacon light 2 is mounted to a top portion of the fuselage 104 and is depicted with a solid circle in FIG. 1. A lower aircraft beacon light 2 is mounted to a bottom portion of the fuselage 104 and is depicted with a dashed circle in FIG. 1. The upper and lower aircraft beacon lights 2 are in accordance with exemplary embodiments of the invention, the details of which will be described in detail below with reference to FIGS. 3 to 9. In operation, the aircraft beacon lights 2 emit flashes of red light, in order to provide for the beacon light behaviour, as expected by other aircraft, ground personnel and air space control. In particular, the aircraft beacon lights 2 may emit flashes of aviation red light.

Figure 2:
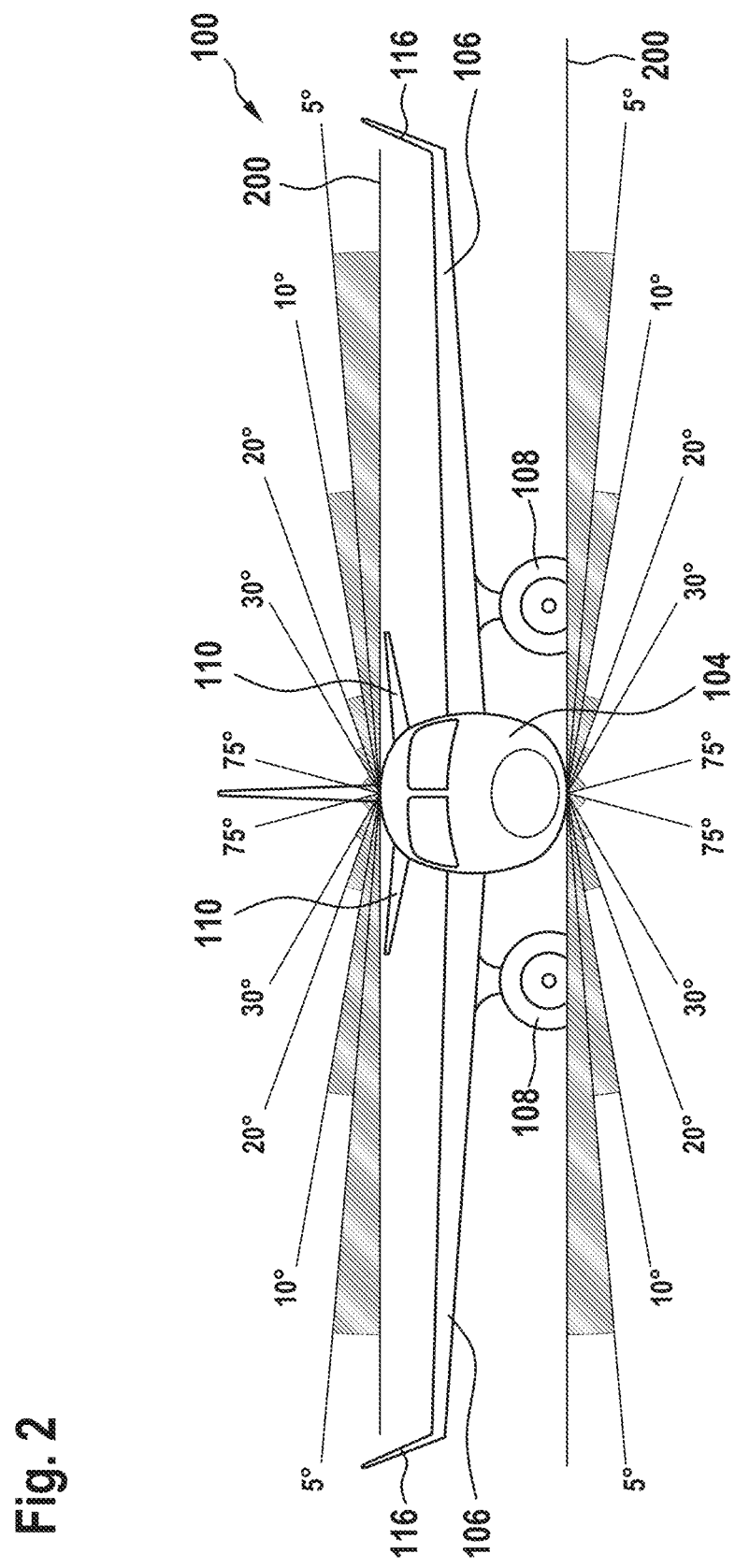
FIG. 2 illustrates the FAR requirements for aircraft beacon lights in an aircraft frame of reference, with an exemplary aircraft being shown in a front view.

FIG. 2 illustrates a light intensity distribution for an upper aircraft beacon light and a light intensity distribution for a lower aircraft beacon light, as required by the Federal Aviation Regulations (FAR), when mounted to the top/bottom of an exemplary aircraft 100. In particular, the depicted light intensity distributions reflect the requirements of FAR section 25.1401, applicable to air planes. The light intensity distributions are shown as angular distributions with respect to horizontal planes 200. In particular, the light intensity distributions are shown in a vertical cross-sectional plane that is orthogonal to the longitudinal extension of the aircraft fuselage. However, as the FAR requirements are described as a rotationally symmetric distribution, i.e. as a distribution that is identical in all viewing directions from the aircraft beacon light, the shown light intensity distributions would look the same in all vertical cross-sections through the center of the upper aircraft beacon light and through the center of the lower aircraft beacon light, respectively.

The depicted light intensity distribution of FIG. 2 is as follows. A light intensity of 400 cd is required for an angular range of between 0° and 5° with respect to the horizontal plane 200. A light intensity of 240 cd is required in an angular range of between 5° and 10° with respect to the horizontal plane 200. A light intensity of 80 cd is required in an angular range between 10° and 20° with respect to the horizontal plane 200. A light intensity of 40 cd is required in an angular range of between 20° and 30° with respect to the horizontal plane 200. A light intensity of 20 cd is required in an angular range of between 30° and 75° with respect to the horizontal plane 200. Accordingly, the required light intensity values, shown as angular sectors in FIG. 2, represent minimum light intensity values, as spelled out by the FAR section 25.1401. As the horizontal plane 200 is the plane with the highest required light intensity, it can also be referred to as main light output plane. The expressions of the beacon light output ful-filling the FAR requirements or satisfying the FAR requirements or being in accordance with the FAR requirements is to be understood as the beacon light output reaching or exceeding the required minimum light intensity values, as described above.

While the FAR requirements, as described above, are a standard set of requirements for aircraft beacon lights, different sets of requirements exist. For example, the Federal Aviation Regulations section 27.1401 comprise a different set of requirements for aircraft beacon lights for rotorcraft. Further, other standard setting bod-ies in the field of aviation and/or individual aircraft manufacturers establish their own sets of requirements. Accordingly, providing aircraft beacon lights that are well-adapted to a particular use case, without creating large design and production complexity for each individual kind of aircraft beacon light, is challenging.

Figure 3:
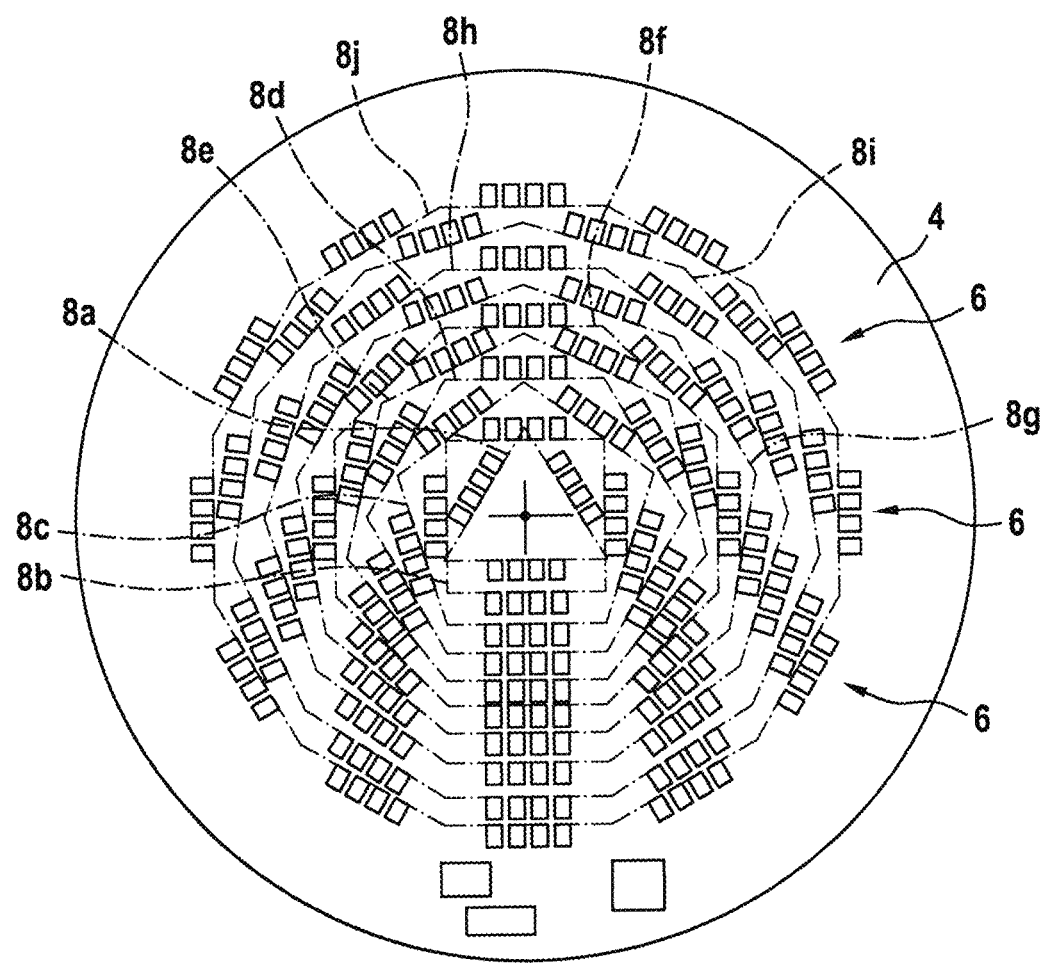
FIG. 3 shows an exemplary light source carrier, as may be used in an aircraft beacon light in accordance with exemplary embodiments of the invention, in a top view.

FIG. 3 shows an exemplary light source carrier 4, which may be used in an aircraft beacon light in accordance with exemplary embodiments of the invention, in a top view. In the exemplary embodiment of FIG. 3, the light source carrier 4 is disc-shaped. Other geometries of the light source carrier 4 are possible as well.

The light source carrier 4 comprises a plurality of connection fields 6. In the exemplary embodiment of FIG. 3, each connection field 6 comprises a linear arrangement of four connection elements. In the exemplary embodiment of FIG. 3, the four connection elements are four recesses in the light source carrier 4. While the light source carrier 4 of FIG. 3 has 75 connection fields 6, only three of those 75 connection fields 6 are denoted with reference numeral 6 for clarity of representation.

In the exemplary embodiment of FIG. 3, the 75 connection fields 6 form ten polygonal connection structures on the light source carrier 4. In particular, three connection fields 6 form a triangular connection structure 8a, four connection fields 6 form a tetragonal connection structure 8b, five connection fields 6 form a pentagonal connection structure 8c, six connection fields 6 form a hexagonal connection structure 8d, seven connection fields 6 form a heptagonal connection structure 8e, eight connection fields 6 form an octagonal connection structure 8f, nine connection fields 6 form a nonagonal connection structure 8g, ten connection fields 6 form a decagonal connection structure 8h, eleven connection fields 6 form a hendecagonal connection structure 8i, and twelve connection fields 6 form a dodecagonal connection structure 8j.

In the exemplary embodiment of FIG. 3, the ten polygonal connection structures are nested polygonal connection structures. In particular, the triangular connection structure 8a is circumscribed by the tetragonal connection structure 8b, which in turn is circumscribed by the pentagonal connection structure 8c, which in turn is circumscribed by the hexagonal connection structure 8d, which in turn is circumscribed by the heptagonal connection structure 8e, which in turn is circumscribed by the octagonal connection structure 8f, which in turn is circumscribed by the nonagonal connection structure 8g, which in turn is circumscribed by the decagonal connection structure 8h, which in turn is circumscribed by the hendecagonal connection structure 8i, which in turn is circumscribed by the dodecagonal connection structure 8j.

In the exemplary embodiment of FIG. 3, the ten polygonal connection structures 8a-8j have regular polygonal shapes, i.e. their individual connection fields 6 all have the same length and are angled with respect to each other in a regular manner along the polygonal structure.

During production, LED modules may be selectively coupled to the connection fields 6 in a desired manner. In particular, during production, a particular one of the polygonal connection structures 8a-8j may be selected and equipped with LED modules. Accordingly, different numbers of LED modules may be provided on the light source carrier 4, depending on which one of the polygonal connection structures 8a-8j is selected for a particular use case of the aircraft beacon light.

In the exemplary embodiment of FIG. 3, the light source carrier 4 is a printed circuit board (PCB). The printed circuit board may have a plurality of electrical connections arranged thereon. The plurality of electrical connections may connect the connection fields 6 to a control unit of the aircraft beacon light, as will be described below.

Figure 4A:
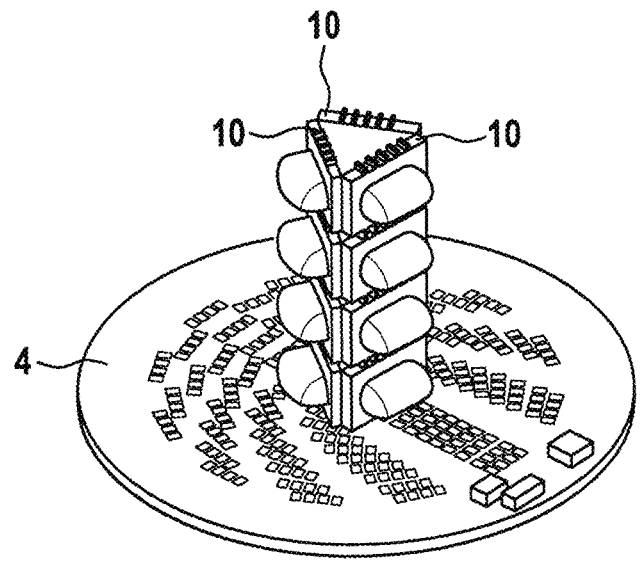
FIGS. 4A-4D show the light source carrier of FIG. 3, equipped with different numbers and kinds of LED modules, in perspective views.

FIG. 4A shows a first exemplary placement of LED modules 10 on the light source carrier 4 of FIG. 3. In the exemplary embodiment of FIG. 4A, three LED modules 10 are arranged on the light source carrier 4 along the triangular connection structure 8a. In particular, each of the three LED modules 10 is an LED strip, having four LED units, respectively. The design of the LED modules 10 as LED strips with multiple LED units will be described in greater detail below. The three LED modules 10 extend from the light source carrier 4 in a substanially orthogonal manner, with their one ends being coupled to the light source carrier 4 and with their edges being connected to each other. In this way, a stable tower structure with a triangular cross-section is established by the plurality of LED modules 10.

In the exemplary embodiment of FIG. 4A, the three LED modules 10 all comprise red light sources.

Figure 4B:
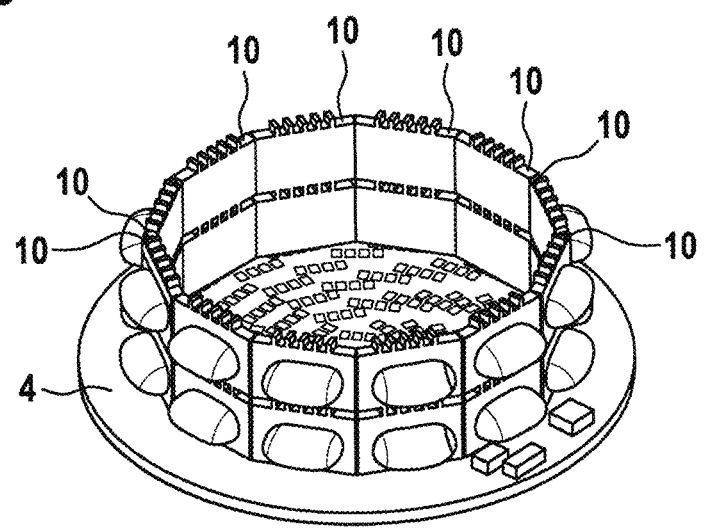

FIG. 4B shows a second exemplary placement of LED modules 10 on the light source carrier 4 of FIG. 3. In particular, twelve LED modules 10 are arranged along the dodecagonal connection structure 8j of the light source carrier 4. In the exemplary embodiment of FIG. 4B, each of the LED modules 10 is an LED strip having two LED units. Again, the plurality of LED modules 10 form a polygonal tower on the light source carrier 4.

In the exemplary embodiment of FIG. 4B, all light sources of the plurality of LED modules 10 may be red light sources. It is also possible that a mixture of light sources is employed in the exemplary embodiment of FIG. 4B. For example, it is possible that four LED strips of red LEDs, four LED strips of white LEDs, and four LED strips of infrared LEDs are provided on the light source carrier 4 in an alternating manner. In this way, all three of red light, white light and infrared light may be provided in a 360° angle around the light source carrier 4 and, thus, around the aircraft beacon light. It is also possible that LED strips with red LEDs and LED strips with white LEDs are provided in an alternating manner or that LED strips with red LEDs and LED strips with infrared LEDs are provided in an alternating manner. Any other suitable arrangement is possible as well.

Figure 4C:
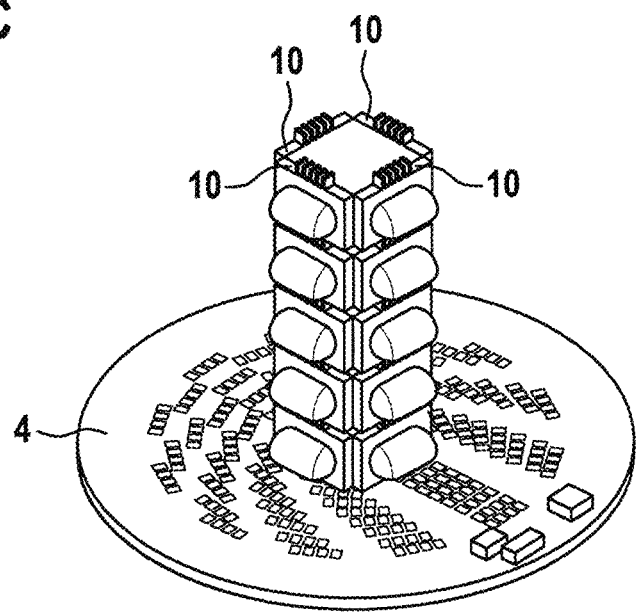

FIG. 4C shows a third exemplary placement of LED modules 10 on the light source carrier 4. In particular, in the exemplary embodiment of FIG. 4C, four LED modules 10 are arranged along the tetragonal connection structure 8b of the light source carrier 4. The LED modules 10 of FIG. 4C are LED strips, each LED strip comprising 5 LED units. The four LED strips form a tower with a square cross-section on the light source carrier 4.

In the exemplary embodiment of FIG. 4C, the four LED modules 10 all comprise red light sources.

Figure 4D:
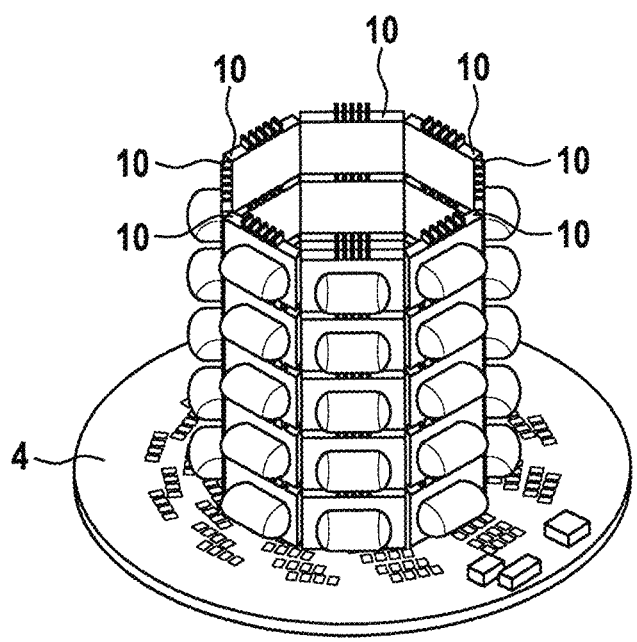

FIG. 4D shows a fourth exemplary placement of LED modules 10 on the light source carrier 4. In particular, in the exemplary embodiment of FIG. 4D, eight LED modules are arranged along the octagonal connection structure 8f of the light source carrier 4. The eight LED modules 10 are eight LED strips, each LED strip comprising five LED units. The eight LED strips form a tower with an octagonal cross-section on the light source carrier 4.

In the exemplary embodiment of FIG. 4D, four LED strips may comprise red light sources and four LED strips may comprise IR light sources or white light sources. In this way, a dual-mode aircraft beacon light with red-flashing functionality and one of white-flashing functionality and IR-flashing funtionality may be provided. It is also possible that all LED strips have red LEDs.

FIGS. 4A to 4D illustrate that various arrangements of LED modules and, thus, various output light intensity distributions of the aircraft beacon light are possible with a single light source carrier 4, as for example shown in FIG. 3. Depending on the desired light output characteristics of an aircraft beacon light, the layout may be conveniently set during production of the aircraft beacon light. The variety of different aircraft beacon lights does not require a large variety of different components, but may be the result of different uses of the light source carrier 4 and the LED modules/LED strips 10.

Figure 5:
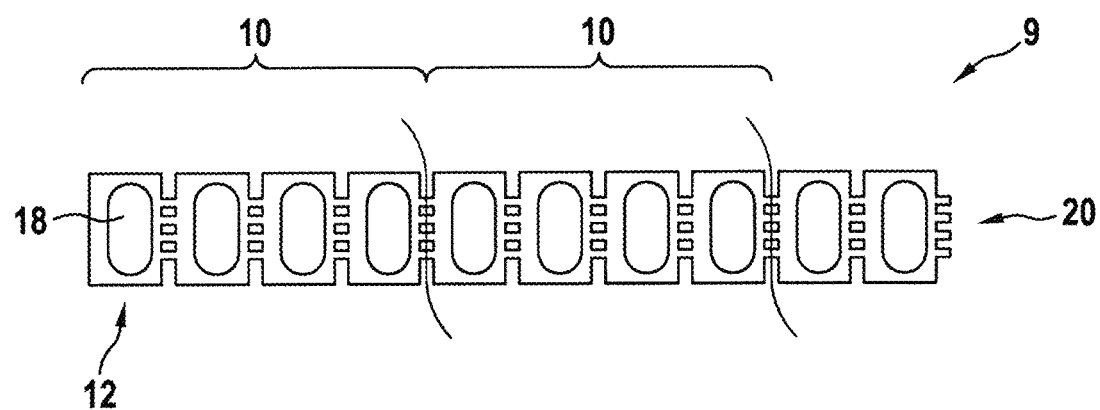
FIG. 5 shows an LED unit stock, which may be the base product for the LED modules used in an aircraft beacon light in accordance with exemplary embodiments of the invention, in a top view.

FIG. 5 shows an LED unit stock 9, which may serve as the base product for the LED strips that may be used in an aircraft beacon light in accordance with exemplary embodiments of the invention. FIG. 5 shows a portion of a large LED unit stock 9, with FIG. 5 depicting a chain of ten LED units 12. During production, suitable sections of the LED unit stock 9 may be torn off the LED unit stock 9 and may be used as LED modules 10 for the desired aircraft beacon light. In FIG. 5, two tear lines are indicated, with the tearing of the LED unit stock 9 along these tear lines resulting in the provision of two LED strips 10, having four LED units 12 each. When being torn, at least one end of the LED strip 10 has four pins 20. With the help of these pins 20, the LED strip 10 may be plugged into the light source carrier 4 at one of the plurality of connection fields 6, as for example depicted in FIGS. 3 and 4. In particular, the pins 20 may be introduced into the recesses in the light source carrier 4 that are provided along a connection field 6.

The pins 20 may, aside from providing a coupling structure between the LED module 10 and the light source carrier 4, provide for electric connections between the light source carrier 4 and the LED module 10. The pins 20 may be soldered onto the light source carrier 4. The soldered connection may provide for a highly reliable electric connection and/or may provide for enhanced mechanical stability between the LED module 10 and the light source carrier 4.

In the exemplary embodiment of FIG. 5, each LED unit 12 comprises exactly one LED. Further in particular, in the exemplary embodiment of FIG. 5, each LED unit 12 comprises exactly one red LED. The respective LEDs are overmolded by light source optics 18. The light source optics 18 may provide for a suitable light conditioning of the light emitted by the LED. In particular, the light source optics 18 may work as a lens, transforming the source-side light intensity distribution of the LED into a desired light output of the individual LED unit 12.

Figure 6:
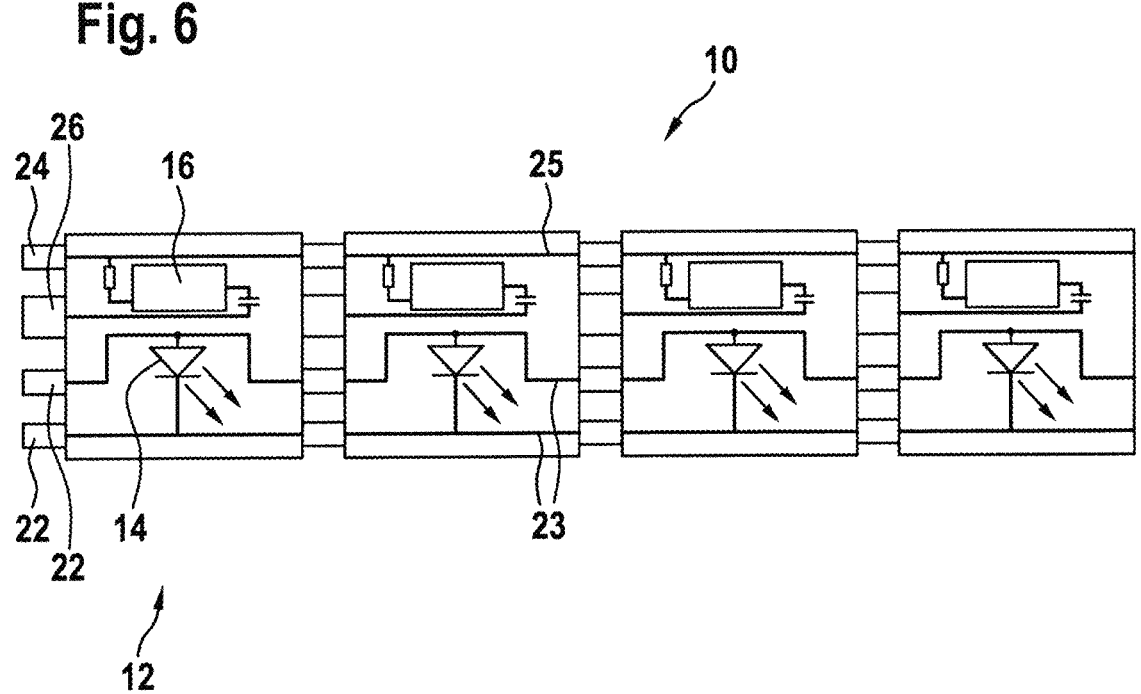
FIG. 6 shows an LED module, as may be used in an aircraft beacon light in accordance with exemplary embodiments of the invention, in a schematic block dia-gram/circuit diagram.

FIG. 6 shows an LED module 10, wich is provided in the form of an LED strip, in a schematic block diagram/circuit diagram. The LED strip 10 of FIG. 6 may for example be used as one of the LED modules 10 of the exemplary combination of the light source carrier 4 and the plurality of LED modules 10, as shown in FIG. 4A. In particular, the LED strip 10 of FIG. 6 has four LED modules 12, which are coupled to each other and which may be, as a strip structure, coupled to the light source carrier 4.

Each of the LED units 12 has an LED 14 and an integrated circuit 16. The integrated circuit 16 may have a memory for storing a unique LED unit identifier. The integrated circuit 16 may further have communication capabilities for conveying the unique LED unit identifier to a control unit of the aircraft beacon light. Further, at the integrated circuit 16 or associated with the integrated circuit 16, there may be further electronic components, such as sensing components, e.g. a temperature sensor or a light intensity sensor.

For being coupled to and for interacting with the light source carrier 4, one of the LED units 12 exposes two power reception pins 22, one communication pin 24, and one LED module detection pin 26. These four pins may be introduced into the associated recesses of a connection field 6 of the light source carrier 4.

The four LED units 12 jointly form two power lines 23 along the LED strip 10, with the LEDs 14 of the LED units 12 being coupled between the two power lines 23. In this way, the LEDs 14 of the LED units 12 form a parallel connection of four LEDs between the two power reception pins 22.

Further, the four LED units 12 of the LED strip 10 jointly form a communication line 25 along the LED strip 10. The integrated circuits 16 of the LED units 12 are coupled to the communication line 25. In particular, the communication line 25 forms a communication bus. A communication channel between the light source carrier 4 and the LED strip 10 may be established via the communication pin 24 and the communication line 25.

The LED module detection pin 26 is coupled to the integrated circuit 16 of that LED unit 12 that exposes the connection pins to the light source carrier 4, i.e. to the integrated circuit 16 of that LED unit 12 that is closest to the light source carrier 4.

Figure 7:
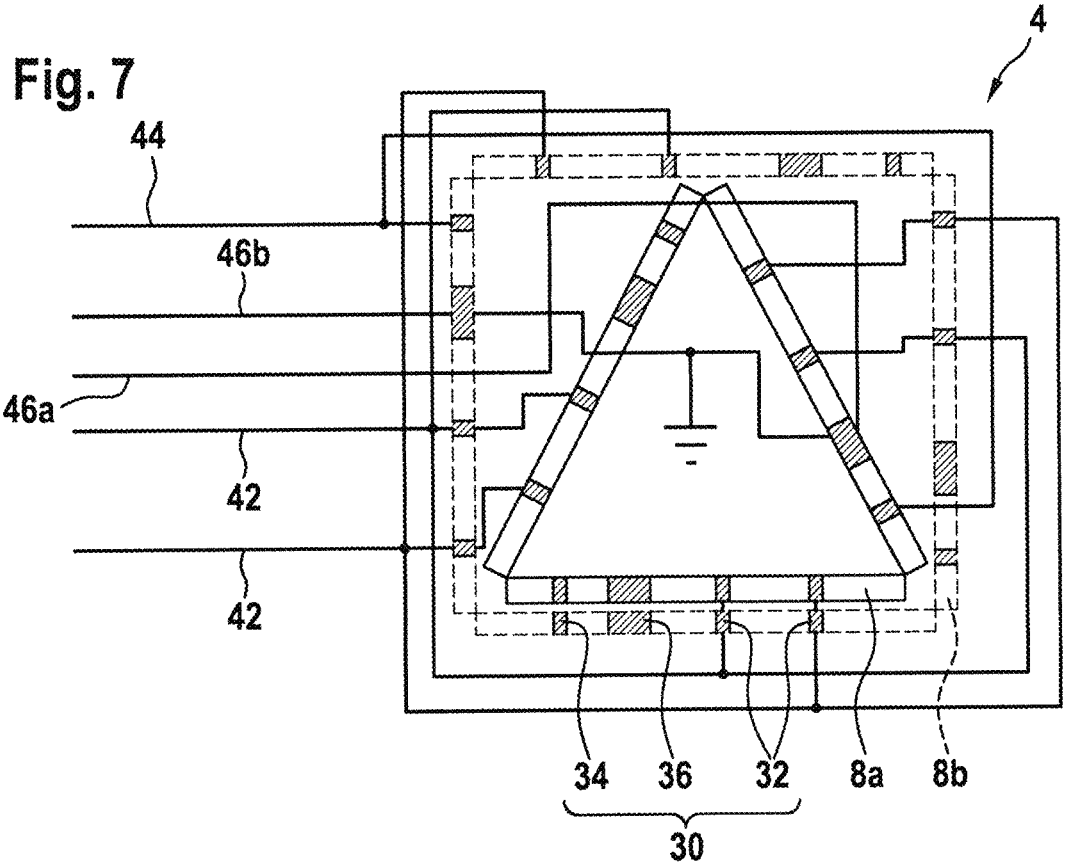
FIG. 7 shows a section of a light source carrier, as may be used in an aircraft beacon light in accordance with exemplary embodiments of the invention, in a schematic block diagram/circuit diagram.

FIG. 7 shows a section of a light source carrier 4, as may be used in an aircraft beacon light in accordance with exemplary embodiments of the invention, in a schematic block diagram/circuit diagram. In particular, FIG. 7 shows the inner most portion of the light source carrier 4 of FIG. 3, namely the triangular connection structure 8a and the tetragonal connection structure 8b, in terms of their connection elements, in particular in terms of their electric connections.

Each of the seven depicted connection fields 6 comprises four electric connections, jointly denoted with reference numeral 30. The four electric connections 30 comprise two power terminals 32, one communication terminal 34, and one LED module detection terminal 36. While all depicted connection fields 6 of the triangular connection structure 8a and the tetragonal connection structure 8b have the same design in terms of the electric connections 30, the reference numerals 32, 34, and 36 are only given with respect to one of the connection fields 6 for ease of readability.

For each of the connection fields 6, the two power terminals 32 are coupled to two power lines 42 of the light source carrier 4. In operation, a control unit of the light source carrier 4 may provide the connection fields 6 with electric power via the connection lines 42 and the power terminals 32. For this purpose, the power reception pins 22, as for example shown in FIG. 6, may be introduced into recesses of the light source carrier 4 that are embodied as power terminals 32.

For each of the two polygonal connection structures 8a, 8b, the communication terminal 34 of one connection field 6 is coupled to a communication line 44 of the light source carrier 4. In this way, the control unit of the aircraft beacon light may address one of the LED modules, irrespective of which one of the polygonal connection structures 8a, 8b is equipped with LED modules. For this purpose, the communication pin 24 of each LED module, as for example shown in FIG. 6, may be introduced into that recess of the connection field 6 that is embodied as the communication terminal 34.

For each of the polygonal connection structures 8a, 8b, the LED module detection terminal 36 is coupled to ground and is coupled to a respective LED module detection line. In particular, the LED module detection terminal 36 of one connection field 6 of the triangular connection structure 8a is coupled to a first LED module detection line 46a of the light source carrier 4. Further in particular, the LED module detection terminal 36 of one connection field 6 of the tetragonal connection structure 8b is coupled to a second LED module detection line 46b of the light source carrier 4. By introducing a pin into such an LED module detection terminal, the respective LED module detection line 46a or 46b is connected to ground. This connection to ground may be detected by the control unit of the aircraft beacon light via the LED module detection lines 46a, 46b.

In operation, the control unit of the aircraft beacon light may use the circuit infrastructure, as described above with respect to FIG. 7, as follows.

As a first step, the control unit may monitor which one of the LED module detection lines is at ground potential. From this detection, the control unit may determine which one of the polygonal connection structures is equipped with LED modules. While the control unit can only detect the presence of one LED module within the particular polygonal connection structure in the framework of FIG. 7, the control unit may assume that LED modules have been arranged along the full polygonal connection structure during production.

As a second step, the control unit of the aircraft beacon light may communicate with the integrated circuits of one LED module of the plurality of LED modules, arranged along the particular one of the polygonal connection structures, via the communication line 44 and the communication terminal 34. In particular, the control unit of the aircraft beacon light may poll the unique LED unit identifiers, as stored on the integrated circuits of the LED units. From this information, the control unit may determine how many LED units are in the LED module that the control unit can address via the communication line 44. The control unit of the aircraft beacon light may assume that LED modules with the same numbers of LED units have been placed along the particular polygonal connection structure during production. At this point, the control unit of the aircraft beacon light is in a position to make a well-reasoned assumption which one of the polygonal connection structures is equipped with LED modules and how many LED units per LED module are present.

As a third step, the control unit may consult a look-up table which contains operating parameters for the aircraft beacon light, depending on the polygonal connection structure used and the number of LED units per LED module. The operating parameter(s) may in particular comprise the operating current for the LED modules.

As a fourth step, the control unit of the aircraft beacon light may provide suitable current pulses in accordance with the looked-up operating parameters to the LEDs of the plurality of the LED modules via the power lines 42.

In this way, the control unit may auto-detect the configuration of the aircraft beacon light and may provide suitable operating conditions for achieving a desired beacon light output. It is possible that a universal control unit may be used during production, and no adaptation of the control unit in accordance with the chosen layout of the aircraft beacon light has to be carried out. While such a highly autonomous behaviour of the aircraft beacon light is possible, it is also possible to store the layout of the aircraft beacon light in the control unit during production and to have the control unit act in accordance therewith.

Figure 8:
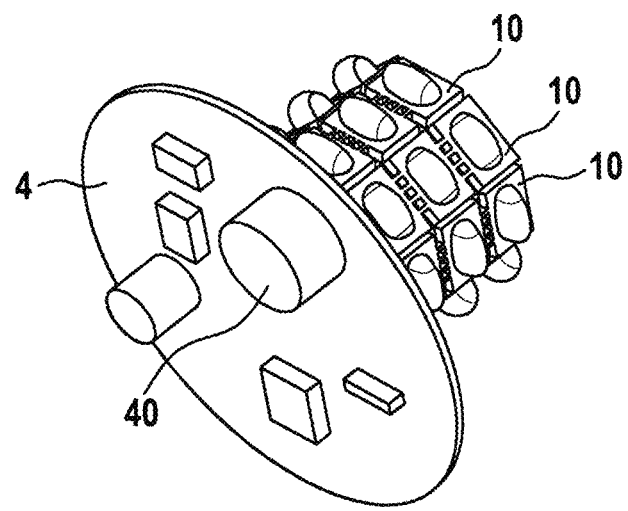
FIG. 8 shows a combination of a light source carrier and a plurality of LED modules, as may be used in an aircraft beacon light in accordance with exemplary embodiments of the invention, in a perspective view.

FIG. 8 shows a combination of a light source carrier 4 and a plurality of LED modules 10, as may be used in an aircraft beacon light in accordance with exemplary embodiments of the invention, in a perspective view. The arrangement of the light source carrier 4 and the plurality of LED modules 10, as shown in FIG. 8, is similar to the arrangement depicted in FIG. 4D. In particular, the plurality of LED modules 10 form an octagonal arrangement on the light source carrier 4. As compared to the viewing direction of FIG. 4D, which depicts the side of the light source carrier 4 having the connection fields 6, FIG. 8 shows the side of the light source carrier 4 facing away from the plurality of LED modules 10. On this back-side of the light source carrier 4, the control unit 40 of the aircraft beacon light is arranged. The control unit 40 may act as described above with respect to FIG. 7.

Figure 9:
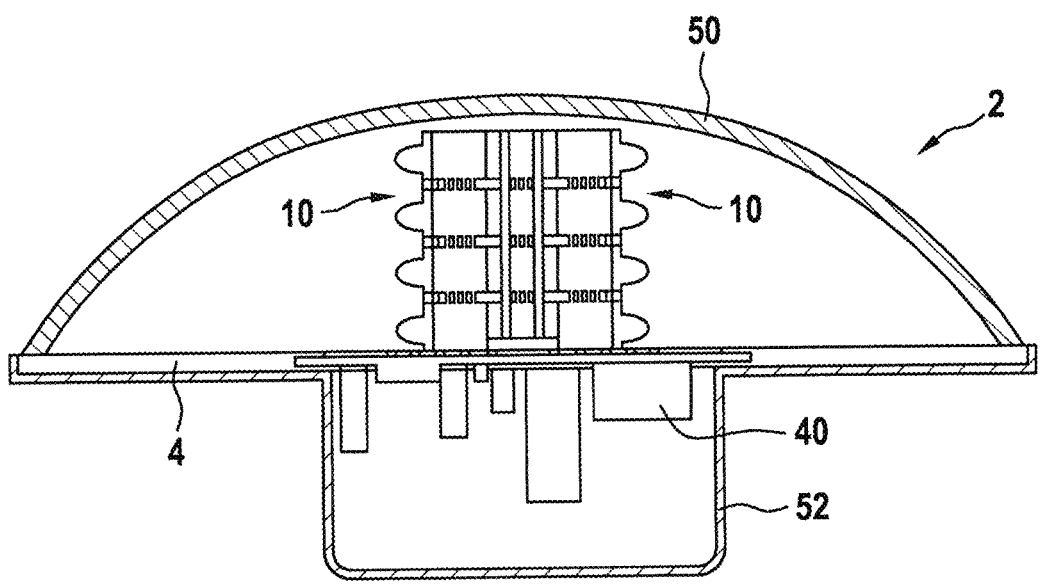
FIG. 9 shows an aircraft beacon light in accordance with an exemplary embodiment of the invention in a cross-sectional view, the aircraft beacon light of FIG. 9 comprising the combination of the light source carrier and the plurality of LED modules, as shown in FIG. 8.

FIG. 9 shows an aircraft beacon light 2 in accordance with an exemplary embodiment of the invention in a cross-sectional view. In particular, the cross-sectional view of FIG. 9 may be a vertical cross-sectional view through the aircraft beacon light 2, when the aircraft beacon light 2 is arranged on a top portion of an aircraft fuselage.

The aircraft beacon light 2 of FIG. 9 comprises the combination of the light source carrier 4 and the LED modules 10, as depicted in FIG. 8. In addition, the aircraft beacon light 2 comprises a lens cover 50, which is a dome-shaped lens cover over the light source carrier 4 and the plurality of LED modules 10. During flight of the aircraft, the lens cover 50 protects the light source carrier 4 and the plurality of LED modules 10 from adverse environmental influences, such as aerodynamic drag, aggressive gases, such as exhaust gases, impact, such as impact due to bird strikes, etc. In the exemplary embodiment of FIG. 9, the lens cover 50 is a transparent lens cover that passes the light from the plurality of LED modules 10 in a substanially unobstructed manner.

The aircraft beacon light 2 of FIG. 9 further comprises a mounting structure 52. The mounting structure 52 is configured for mounting the aircraft beacon light 2 to the fuselage of an aircraft. In particular, the mounting structure 52 may be configured for mounting the aircraft beacon light 2 to an upper portion or to a lower portion of the fuselage of an aircraft. The aircraft may be an air plane or a rotorcraft.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft beacon light, comprising: a light source carrier on the aircraft, wherein the light source carrier comprises a plurality of connection fields, with the plurality of connection fields forming at least two polygonal connection structures on the light source carrier, wherein the at least two polygonal connection structures are nested polygonal connection structures; and
   a plurality of LED modules, with the plurality of LED modules being arranged along a particular one of the at least two polygonal connection structures and with each of the plurality of LED modules being coupled to a respective connection field of said particular one of the at least two polygonal connection structures.

2. An aircraft beacon light according to claim 1, wherein each of the plurality of connection fields comprises a plurality of electric connections between the respective LED module and the light source carrier, wherein the plurality of electric connections in particular comprise two power terminals, a communication terminal, and an LED module detection terminal.

3. An aircraft beacon light according to claim 1 wherein each of the plurality of connection fields comprises a mechanical socket and wherein each of the plurality of LED modules is coupled to the mechanical socket of the respective connection field.

4. An aircraft beacon light according to claim 3, wherein each of the plurality of LED modules comprises a plurality of connection pins introduced into associated recesses of the mechanical socket.

5. An aircraft beacon light according to claim 1,
   wherein the at least two polygonal connection structures comprise between 2 and 12 polygonal connection structures,
   or
   wherein the at least two polygonal connection structures comprise at least two of a triangular connection structure, a tetragonal connection structure, a pentagonal connection structure, a hexagonal connection structure, a heptagonal connection structure, an octagonal connection structure, a nonagonal connection structure, a decagonal connection structure, a hendecagonal connection structure, and a dodecagonal connection structure.

6. An aircraft beacon light according to claim 1, wherein the at least two polygonal connection structures have regular polygonal shapes.

7. An aircraft beacon light according to claim 1, wherein the plurality of LED modules are a plurality of LED strips, each comprising between 2 and 8 LED units.

8. An aircraft beacon light according to claim 7, wherein the plurality of LED strips have a substantially orthogonal orientation with respect to the light source carrier, with the plurality of LED units of each LED strip forming an LED stack on the light source carrier.

9. An aircraft beacon light according to claim 7,
wherein, for at least one of the plurality of LED strips, each of the LED units comprises an LED and an integrated circuit, wherein the integrated circuit in particular comprises at least one of a memory containing an LED unit identifier, a temperature sensor, a light intensity sensor, and a humidity sensor,
or
wherein, for at least one of the plurality of LED strips, at least one power line and at least one communication line run along the LED units of the LED strip.

10. An aircraft beacon light according to claim 1, wherein the light source carrier is a printed circuit board.

11. An aircraft beacon light according to claim 1, further comprising a light transmissive lens cover, in particular a dome-shaped light transmissive lens cover, arranged over the light source carrier and the plurality of LED modules.

12. An aircraft comprising:
at least one aircraft beacon light in accordance with claim 1,
wherein the beacon light is an upper aircraft beacon light in accordance and is arranged on an upper portion of a fuselage of the aircraft,
wherein the beacon light is a lower aircraft beacon light arranged on a lower portion of the fuselage of the aircraft.

13. A method of operating an aircraft beacon light according to claim 1, the method comprising:
detecting the particular one of the at least two polygonal connection structures along which the plurality of LED modules are arranged;
for at least one of the plurality of LED modules, determining a number of LED units in said at least one of the plurality of LED modules;
on the basis of the particular one of the at least two polygonal connection structures and on the basis of the number of LED units, setting at least one operating parameter, such as an operating current, for the plurality of LED modules; and
operating the plurality of LED modules in accordance with said at least one operating parameter.

14. A method of producing an aircraft beacon light, comprising:
providing a light source carrier on the aircraft, wherein the light source carrier comprises a plurality of connection fields, with the plurality of connection fields forming at least two polygonal connection structures on the light source carrier, wherein the at least two polygonal connection structures are nested polygonal connection structures; and
arranging a plurality of LED modules, in particular a plurality of LED strips, along a particular one of the at least two polygonal connection structures and coupling each of the plurality of LED modules to a respective connection field of said particular one of the at least two polygonal connection structures.

15. The method according to claim 14, wherein said arranging of a plurality of LED modules along a particular one of the at least two polygonal connection structures comprises:
coupling at least one LED module of a first kind, comprising at least one integrated circuit, to at least one connection field of said particular one of the at least two polygonal connection structures, and
coupling at least one LED module of a second kind, not comprising an integrated circuit, to at least one connection field of said particular one of the at least two polygonal connection structures.

16. An aircraft beacon light, comprising: a light source carrier, wherein the light source carrier comprises a plurality of connection fields, with the plurality of connection fields forming at least two polygonal connection structures on the light source carrier; and
a plurality of LED modules, with the plurality of LED modules being arranged along a particular one of the at least two polygonal connection structures and with each of the plurality of LED modules being coupled to a respective connection field of said particular one of the at least two polygonal connection structures;
wherein each of the plurality of connection fields comprises a plurality of electric connections between the respective LED module and the light source carrier;
wherein each of the plurality of connection fields comprises a mechanical socket and wherein each of the plurality of LED modules is coupled to the mechanical socket of the respective connection field.

17. An aircraft beacon light according to claim 16.

18. An aircraft beacon light according to claim 16, wherein the plurality of LED modules are a plurality of LED strips, each comprising a plurality of LED units.

19. An aircraft beacon light according to claim 18 4-9, wherein the plurality of LED strips have a substantially orthogonal orientation with respect to the light source carrier, with the plurality of LED units of each LED strip forming an LED stack on the light source carrier.

\* \* \* \* \*